United States Patent
Norton et al.

(10) Patent No.: US 10,604,860 B2
(45) Date of Patent: Mar. 31, 2020

(54) ALTERNATIVE E-COAT DIPPING PROCESS

(71) Applicant: Ford Motor Company, Dearborn, MI (US)

(72) Inventors: Thomas Norton, Ann Arbor, MI (US); Kevin Ellwood, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 216 days.

(21) Appl. No.: 15/829,247

(22) Filed: Dec. 1, 2017

(65) Prior Publication Data
US 2019/0169765 A1 Jun. 6, 2019

(51) Int. Cl.
| *C25D 13/12* | (2006.01) |
| *B65G 35/06* | (2006.01) |
| *C25D 13/22* | (2006.01) |
| *B65G 49/04* | (2006.01) |
| *B65G 17/20* | (2006.01) |

(52) U.S. Cl.
CPC .......... *C25D 13/12* (2013.01); *B65G 17/20* (2013.01); *B65G 35/06* (2013.01); *B65G 49/0413* (2013.01); *C25D 13/22* (2013.01); *B65G 2201/0294* (2013.01)

(58) Field of Classification Search
CPC ........ C25D 13/12; C25D 13/22; B65G 17/20; B65G 35/06; B65G 49/0413; B65G 2201/0294; B65G 49/0459; B66C 1/12; B66C 1/16; B05C 3/09; B05C 3/10
See application file for complete search history.

(56) References Cited

U.S. PATENT DOCUMENTS

| 2,598,163 | A | 5/1952 | Collins et al. |
| 2,678,025 | A | 5/1954 | Straky |
| 5,433,783 | A | 7/1995 | Ichinose et al. |
| 6,419,983 | B1 * | 7/2002 | Kreuzer ............ B65G 49/0459 427/242 |
| 6,902,051 | B2 | 6/2005 | Dehne et al. |
| 7,026,015 | B2 | 4/2006 | Kreuzer |
| 7,081,164 | B2 | 7/2006 | Kyotani |

FOREIGN PATENT DOCUMENTS

GB 654118 6/1951

OTHER PUBLICATIONS

Belis, R., E-Coating Simulation, Aug. 2017, available at URL http://www.pfonline.com/articles/ecoatingsimulation.

* cited by examiner

Primary Examiner — Xiuyu Tai
(74) Attorney, Agent, or Firm — Burris Law, PLLC

(57) ABSTRACT

The present disclosure includes a method for coating a vehicle body-in-white (BIW) in a tank of processing fluid. In one form, the method includes lowering the vehicle BIW in a tank of processing fluid, rotating the vehicle BIW around its lateral axis until the vehicle BIW is completely submerged in the processing fluid, and simultaneously conveying the vehicle BIW along a longitudinal axis of the tank while rotating the vehicle BIW around its longitudinal axis in a "corkscrew" type movement.

20 Claims, 2 Drawing Sheets

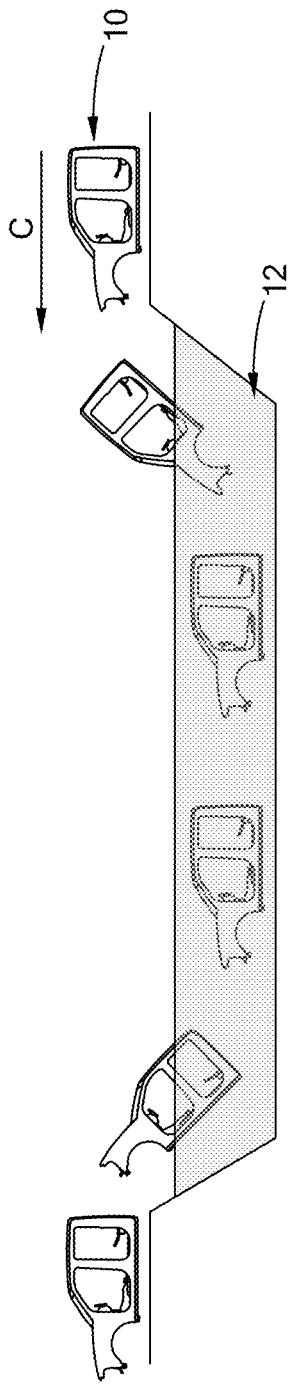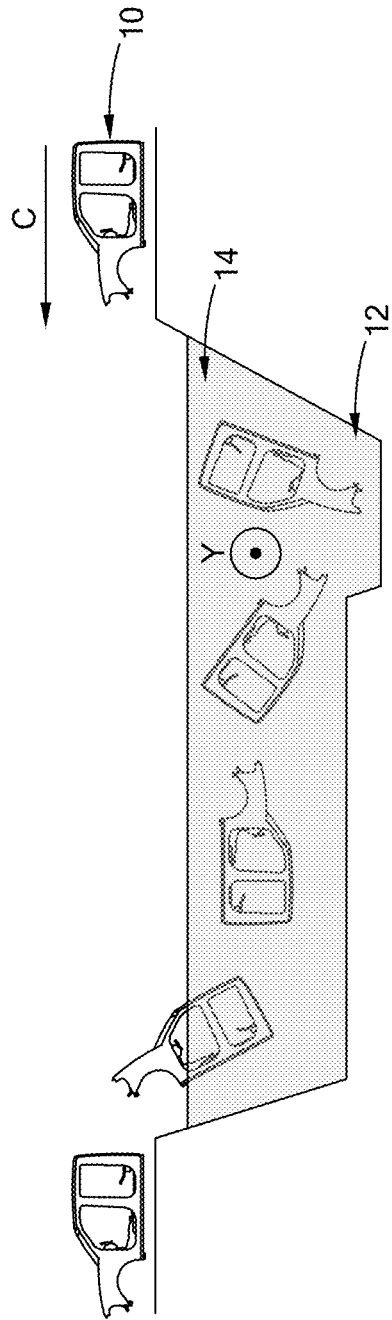

ALTERNATIVE E-COAT DIPPING PROCESS

FIELD

Figure 3:
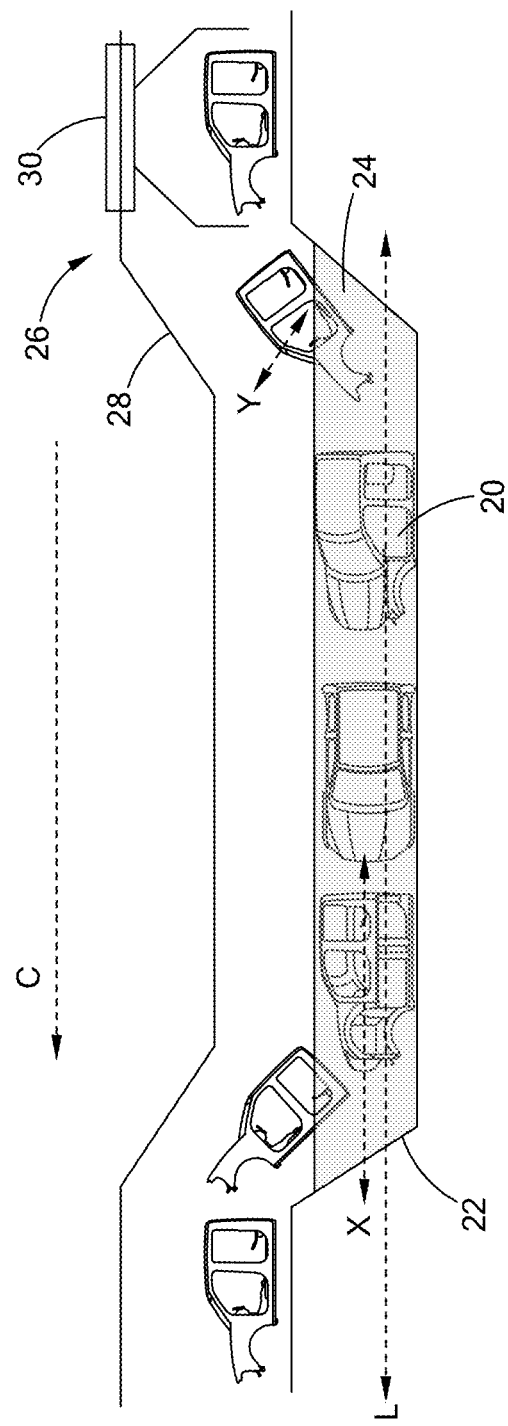

The present disclosure relates to a method for coating an object in a tank of processing fluid, and more particularly to a method of e-coating a body-in-white vehicle.

BACKGROUND

The statements in this section merely provide background information related to the present disclosure and may not constitute prior art.

Electrophoretic deposition coating ("E-coating") is a coating process that is used to deposit an organic film by an electrical charge. The coating in some applications is used as a primer for corrosion protection in automotive applications, and more specifically for a Body-in-White (BIW).

Referring to FIG. 1, an exemplary straight dipping method for high volume E-coating of an automotive Body-in-White (BIW) is illustrated, in which the automotive BIW 10 is conveyed through a processing fluid tank 12 in a conveying direction C. The vehicle BIW 10 maintains a constant position while being conveyed through the processing fluid tank 12. For example, the vehicle BIW 10 maintains a similar orientation to that of which the vehicle is designed to be used in. Challenges and/or inefficiencies associated with the straight dipping method include: hard to reach surface areas or parts of the vehicle BIW 10 not being reached by the processing liquid, such as recesses, resulting in uncoated metal, uneven film coverage, and a film layer thickness below standards; increased air entrapment resulting in discontinuity of the film being applied; and increased likelihood of excess E-coat being applied to susceptible surface areas, thereby creating uneven film coverage. These inefficiencies contribute to improper finish and decreased corrosion protection.

Referring to FIG. 2, another exemplary dipping method for high volume E-coating of a BIW is illustrated, often referred to as roll dipping. In this method, the BIW 10 is conveyed through the processing liquid tank 12 in a conveying direction C and is tumbled, or rolled around a lateral axis Y (shown in and out of the page), while submerged in the processing fluid tank 12. Challenges and/or inefficiencies with the roll dipping method include: high loading conditions that can permanently deform parts of the vehicle BIW; and depths of the processing tank need to be deeper than the length of the vehicle BIW to maintain full submersion of the vehicle BIW while being rotated around its lateral axis Y. These inefficiencies increase overall waste and production costs.

The inefficient corrosion protection, finish, and increased production costs of known E-coating processes, among other issues related to the coating of an automotive BIW, are addressed by the present disclosure.

SUMMARY

In one form, the present disclosure provides a method of coating a component in a tank of processing fluid. The method includes lowering the component into the tank of processing fluid until the component is completely submerged in the processing fluid and simultaneously conveying the component along a longitudinal axis of the tank while rotating the component at a constant depth around its longitudinal axis. The processing fluid may be an electrophoretic fluid.

In another form, a method of coating a vehicle body-in-white (BIW) in a tank of processing fluid is provided that comprises lowering the vehicle BIW into the tank of processing fluid until the vehicle BIW is completely submerged in the processing fluid and simultaneously conveying the vehicle BIW along a longitudinal axis of the tank while rotating the vehicle BIW at a constant depth around a longitudinal axis of the vehicle BIW.

Another method is provided that includes lowering a vehicle BIW head-first and into the tank of processing fluid, rotating the vehicle BIW around a lateral axis until the vehicle BIW is completely submerged in the processing fluid, and simultaneously conveying the vehicle BIW along a longitudinal axis of the tank while rotating the vehicle BIW at a constant depth around a longitudinal axis of the vehicle BIW.

Various forms of the method according to the present disclosure may include one or more of the following steps: transferring the vehicle BIW through the tank at a constant transfer rate; rotating the vehicle BIW around the longitudinal axis 360° and then extracting the vehicle BIW from the tank of processing fluid; and providing a tank that defines a constant depth along its length.

In another form, the longitudinal axis of the tank coincides with a longitudinal axis of the vehicle BIW. Alternatively, the longitudinal axis of the tank is offset from a longitudinal axis of the vehicle BIW.

A vehicle having a coating according to the method of the present disclosure is also provided.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a progressive illustration of a E-coating process according to the prior art;

FIG. 2 is a progressive illustration of another E-coating process according to the prior art; and FIG. 3 is a progressive illustration of a coating process, which in one form may be an E-coating process, in accordance with the teachings of the present disclosure The drawings described herein are for illustration purposes only and are not intended to limit the scope of the present disclosure in any way. It should be understood that throughout the drawings, corresponding reference numerals indicate like or corresponding parts and features.

DETAILED DESCRIPTION

The following description is merely exemplary in nature and is not intended to limit the present disclosure, application, or uses.

Referring to FIG. 3, a component 20, such as a vehicle Body-in-White (BIW) 20, is conveyed through a tank 22 of processing fluid 24 along a longitudinal axis L in accordance with the teachings of the present disclosure. As shown, an exemplary conveyor system 26 is configured to transport the vehicle BIW 20 and includes conveyor rails 28 and carriers 30 that are driven by the conveyor system 26. Various conveyor systems may be employed while remaining within the scope of the present disclosure, including by way of example those supplied by Duerr Systems AG or EISENMANN SE.

It should be understood that the use of a vehicle BIW is merely exemplary and other components, such as for example, individual vehicle parts, appliances, and other parts of a variety of applications may be employed while remaining within the scope of the present disclosure.

In one form of the present disclosure, the processing fluid in the tank 22 is an electrophoretic fluid for E-coating the vehicle BIW 20. However, it should be understood that other fluids may be employed while remaining within the scope of the present disclosure and thus the reference to E-coating should not be construed as limiting the scope of the present disclosure.

Advantageously, the conveyor system 26 is configured to simultaneously convey the vehicle BIW 20 along a longitudinal axis L of the tank 22 while rotating the vehicle BIW 20 around its longitudinal axis X. In this way, the vehicle BIW 20 undergoes a "cork-screw" movement, which increases the efficiency of the coating process. In one form, the vehicle BIW 20 is lowered head-first into the tank 22 and is rotated around its lateral axis Y until it is completely submerged in the processing fluid 24 as shown. As the conveyor system 26 conveys and lowers the vehicle BIW 20 into the tank 22, rotation around the lateral axis Y continues until the vehicle BIW 20 is completely submerged in the processing fluid 24.

Once the vehicle BIW 20 is completely submerged in the processing fluid 24, the vehicle BIW 20 is rotated around its longitudinal axis X as it moves through the tank 22. More specifically, when the vehicle BIW 20 is fully submerged in the processing fluid 24, the conveyor system 26 continues to transport the vehicle BIW 20 along the longitudinal axis L while simultaneously rotating the vehicle BIW 20 around its longitudinal axis X. When the rotation(s) is/are complete, the vehicle BIW 20 is extracted from the tank 22.

In one form of the present disclosure, the vehicle BIW 20 is rotated 360° around its longitudinal axis X before being extracted from the tank 22. In another form, the tank 22 defines a constant depth. The number of rotations and/or the depth of the tank 22 may vary depending on the component being treated and type of processing system employed, among other variables.

In another form, the transfer rate of the vehicle BIW 20 through the tank 22 is constant. However, any transfer rate may be employed while still remaining within the scope of the present disclosure.

As shown in FIG. 3 compared to FIG. 2, the vehicle BIW 20 no longer requires the tank 22 to have a depth D that is deeper than the length of the vehicle BIW 20. In other words, the vehicle BIW 20 is not coated such that the vehicle BIW 20 is positioned substantially vertical when entering the tank 22. Instead, rotation around its longitudinal axis X keeps the vehicle BIW 20 substantially parallel to the bottom of the tank 22, thereby decreasing the depth and amount of processing liquid used to fill the tank 22. This smaller depth and volume of processing fluid 24 reduces production costs and waste.

In one form, the longitudinal axis L of the tank 22 coincides with the longitudinal axis X of the vehicle BIW 20. Alternatively, the longitudinal axis L is offset from the longitudinal axis X of the vehicle BIW 20, as shown in FIG. 3.

It should be understood that the conveyor system 26 illustrated and described herein is merely exemplary and used for clarity purposes only and thus any assembly or system capable of securing, conveying, or transporting a component such that the component is simultaneously conveyed along a longitudinal axis of a tank while being rotated around its longitudinal axis may be employed while remaining within the scope of the present disclosure.

The corkscrew action or rotation around the longitudinal axis A, as opposed to rotating around a lateral axis Y of the vehicle BIW 20, while fully submerged in the processing fluid releases entrapped air, thereby reducing air bubbles between the vehicle BIW 20 and E-coat. Reducing air bubbles that result from the entrapped air creates an unblemished, uniform layer of processing fluid or E-coat and thus improved finish.

The corkscrew rotation also provides full E-coat coverage by allowing the processing fluid to reach otherwise hard to reach surface areas, such as for example, recesses of complex fabricated metal products. Further, the corkscrew action increases uniformity of the film coverage on all surfaces of the vehicle BIW 20. The reduction of uncoated metal and uneven distribution of E-coat contributes to improved finish and greater corrosion protection.

Furthermore, the corkscrew action or rotation around the longitudinal axis X of the vehicle BIW 20, as opposed to rotating around its lateral axis Y, reduces loading conditions on parts or panels of the vehicle BIW 20. With this reduced loading, parts or panels of the vehicle BIW 20 deflect less and thus adhesive bonds and hems are less likely to separate. In addition, reduced loading will reduce permanent/plastic deformity of the parts or panels of the vehicle BIW 20, thus reducing overall production costs.

It should be understood that the present disclosure is not limited to E-coating and the disclosed method may be implemented in any system, such as a cleansing/rinsing system, finishing system, or any treatment system without departing from the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of coating a vehicle body-in-white (BIW) in a tank of processing fluid comprising:
   lowering the vehicle BIW head-first into the tank of processing fluid;
   rotating the vehicle BIW around a lateral axis until the vehicle BIW is completely submerged in the processing fluid; and
   simultaneously conveying the vehicle BIW along a longitudinal axis of the tank while rotating the vehicle BIW around a longitudinal axis of the vehicle BIW 360°.

2. The method according to claim 1, wherein the vehicle BIW is rotated around its longitudinal axis 360° at a constant depth in the processing fluid and is then extracted from the tank of processing fluid.

3. The method according to claim 1, wherein the processing fluid is an electrophoretic fluid.

4. The method according to claim 1, wherein a transfer rate of the vehicle BIW through the tank is constant.

5. The method according to claim 1, wherein the longitudinal axis of the tank coincides with the longitudinal axis of the vehicle BIW.

6. The method according to claim 1, wherein the longitudinal axis of the tank is offset from the longitudinal axis of the vehicle BIW.

7. The method according to claim 1, wherein the tank defines a constant depth along its length.

8. A vehicle having a coating according to the method of claim 1.

9. A method of coating a vehicle body-in-white (BIW) in a tank of processing fluid comprising:
lowering the vehicle BIW into the tank of processing fluid until the vehicle BIW is completely submerged in the processing fluid; and
simultaneously conveying the vehicle BIW along a longitudinal axis of the tank while rotating the vehicle BIW around a longitudinal axis of the vehicle BIW 360°.

10. The method according to claim 9, wherein the vehicle BIW is rotated around the longitudinal axis 360° at a constant depth in the processing fluid and is then extracted from the tank of processing fluid.

11. The method according to claim 9, wherein the processing fluid is an electrophoretic fluid.

12. The method according to claim 9, wherein a transfer rate of the vehicle BIW through the tank is constant.

13. The method according to claim 9, wherein the longitudinal axis of the tank coincides with the longitudinal axis of the vehicle BIW.

14. The method according to claim 9, wherein the longitudinal axis of the tank is offset from the longitudinal axis of the vehicle BIW.

15. The method according to claim 9, wherein the tank defines a constant depth along its length.

16. A vehicle having a coating according to the method of claim 9.

17. A method of coating a component in a tank of processing fluid comprising:
lowering the component into the tank of processing fluid until the component is completely submerged in the processing fluid; and
simultaneously conveying the component along a longitudinal axis of the tank while rotating the component around a longitudinal axis of the component 360°.

18. The method according to claim 17, wherein a transfer rate of the component through the tank is constant.

19. The method according to claim 17, wherein the tank defines a constant depth along its length.

20. The method according to claim 17, wherein the component is a vehicle body-in-white (BIW).

* * * * *